May 29, 1934.  R. W. JOHNSON  1,960,491
FISHING REEL
Filed June 22, 1933
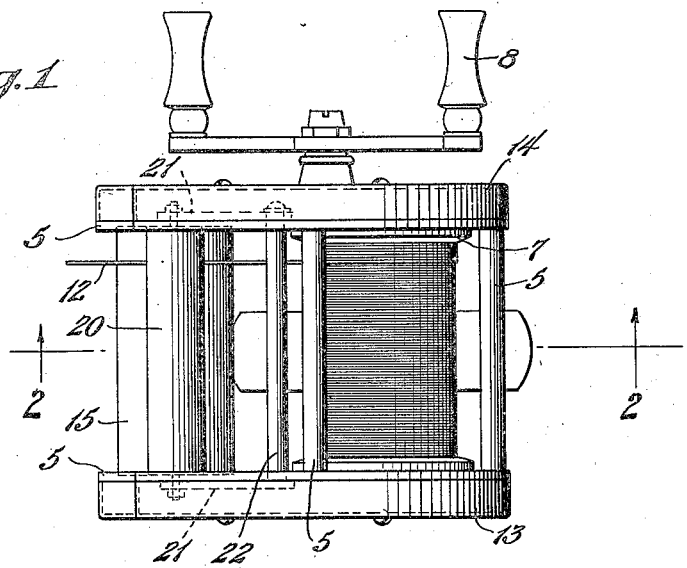
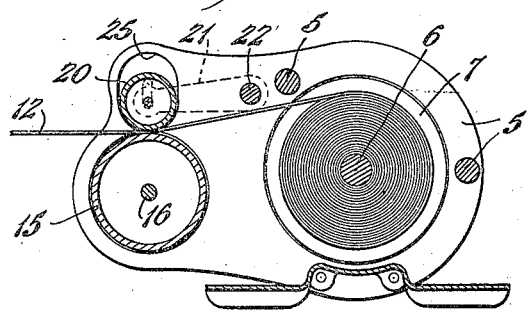
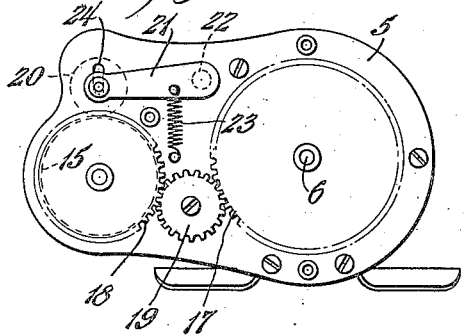 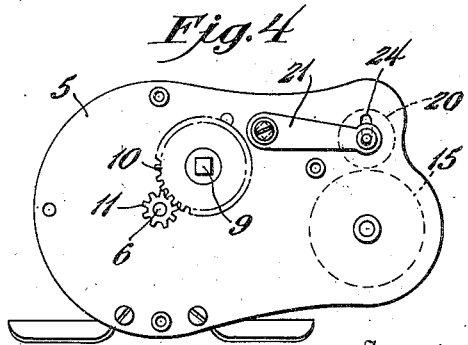
Inventor
R. W. Johnson
By Philip P. Siggers Attorney Patented May 29, 1934

1,960,491

UNITED STATES PATENT OFFICE 1,960,491

FISHING REEL

Richard W. Johnson, Danville, Pa., assignor of one-fourth to Charles W. Johnson

Application June 22, 1933, Serial No. 677,132

4 Claims. (Cl. 242—84.5)

This invention relates to fishing reels and among other objects, aims to provide an improved reel so constructed as to prevent "backlash". The invention particularly aims to improve on the construction disclosed in the Higbee Patent No. 1,398,721 dated Nov. 29, 1921.

In the accompanying drawing showing a preferred embodiment of the invention,—

Fig. 1 is a plan view of the complete reel;

Fig. 2 is a section on line 2—2 of Fig. 1;

Fig. 3 is a side elevation of the reel with one cover plate removed (the one shown at the bottom of Fig. 1); and Fig. 4 is an elevation of the opposite end of the reel, showing the other cover plate removed.

Ordinary fishing reels are subject to "back lash" or unwinding of the line on the rapidly rotating reel during a cast, because the reel rotates so rapidly that its feeds out the line faster than the line can run through the guides on the pole. Back lash, of course, not only spoils the cast, but not infrequently causes such a snarling of the line that it must either be cut or else the fisherman must patiently work on the snarl until the line is cleared, thus losing considerable time when the indications for fishing may be excellent. Nothing is more exasperating to the sportsman than to snarl his line when game-fish are leaping out of the water all about him. Hence any device which will eliminate the possibility of back lash is of primary importance in the art of fishing reels.

The Higbee patent, mentioned above, has for its object the elimination of back lash, but experiment proves that the construction disclosed in said patent is unsatisfactory for three reasons. The first is that the driven rollers between which the line passes are so small that their speed is excessive, resulting in a diminishing of the force of the cast (and hence a lessening of the distance attainable). The second is that there is no controlled tension between the two driven rollers: they are usually either too tight or too loose, and no adjustment is possible because the axes of the rollers must be fixed. Thirdly, there is no provision for taking care of lines of different thicknesses, and this is vitally important. The present invention overcomes all the drawbacks of the Higbee construction.

Referring particularly to the drawing, there is shown a fishing reel comprising a frame 5, a shaft 6 journaled in the frame 5, a spool 7 secured to the shaft 6, a handle 8, a handle shaft 9 to which the handle is secured, a gear 10 secured to the handle shaft, and a pinion 11 meshing with gear 10 and secured to one end of shaft 6, so that rotation of the handle effects more rapid rotation of the spool 7, on which the fishing line 12 is wound. Covers 13 and 14 at the opposite ends of the frame enclose the working parts, and are secured as by screws to the frame.

The anti-back-lash attachment comprises a pair of rollers, one of which is larger than the other and is positively driven by the spool at a speed equal to or slightly exceeding the linear speed of the spool, the other roller being an idler roller which is urged toward the periphery of the larger roller by spring tension. The fishing line 12 is trained between and fed forwardly by said rollers, which because of their speed of rotation maintain a constant tension on the fishing line as it leaves the reel. It is this constant tension which makes back lash impossible, as no surplus length of line can form near the reel to make a snarl.

As shown, a roller 15, which is preferably cylindrical, is rotatably mounted on an axle or fixed shaft 16 secured to frame 5. The diameter of roller 15 is preferably greater than half the diameter of the spool 7. A gear 17, fixed to the spool shaft 6, drives roller 15 through a gear 18 and an idler 19. These three gears are enclosed and protected by cover 13. As gear 17 has about the diameter of spool 7 and gear 18 approximates the diameter of roller 15, it follows that rotation of the spool either by means of the handle or by direct pull of the line, as during a cast, effects rotation of roller 15 but at a higher speed.

The line 12 is pressed against the periphery of roller 15 by means of an idler roller 20, whose diameter is small compared with the diameter of roller 15, and which is driven due to its contact with the line 12. Preferably idler roller 20 is pivotally mounted on the frame, although it could be mounted in slide-bearings, and to this end, links 21 are connected at their free ends to the axle of roller 20 and are rigidly secured at their opposite ends on a shaft 22 extending through the ends of the frame, so as to be enclosed by covers 13, 14. One or more springs 23 urge the idler roller 20 toward the driven roller 15. To guide roller 20, the frame 5 has short, arcuate slots 24, and the ends of roller 20 project into shallow guiding grooves 25 provided on the inside faces of the relatively thick plates which form the ends of frame 5. The ends of roller 15 also project into shallow recesses (not shown) on the inside faces of the same plates. This prevents the line from wedging in between the frame and the ends of the rollers.

With appropriate gear arrangement, the operating mechanisms may all be housed on one side only of the reel.

When a cast is made, the rollers 15 and 20 rotate sufficiently fast to pull on line 12, so that it is under tension as it leaves the reel. This tension makes the occurrence of back lash impossible, so that the sportsman is assured of a perfect cast, so far as the operation of the reel governs such cast.

Obviously, the invention may be embodied in several forms other than the one shown and described.

Having described a preferred embodiment of the invention, what I claim as new and desire to secure by Letters Patent is:—

1. A fishing reel comprising, in combination, a frame; a spool rotatably mounted on the frame; a cylindrical roller also mounted on the frame but spaced from the spool; mechanical connections between the spool and the roller to effect accelerated rotation of the roller whenever the spool is rotated, the direction of rotation of both members being the same; an idler roller movably carried on the frame; a spring urging the idler roller toward the periphery of the driven roller; the fishing line being adapted to pass between said rollers to effect simultaneous rotation of both, and being thus placed under tension to obviate back lash.

2. A fishing reel comprising, in combination, a frame; a spool rotatably mounted on the frame; a cylindrical roller also mounted on the frame but spaced from the spool; said roller having a diameter exceeding half the diameter of the spool; mechanical connections between the spool and the roller to effect accelerated rotation of the roller whenever the spool is rotated, the direction of rotation of both members being the same; an idler roller which is of small diameter compared with the driven roller and which is movably carried on the frame; a spring urging the idler roller toward the periphery of the driven roller; the fishing line being adapted to pass between said rollers to effect simultaneous rotation of both, and being thus placed under tension to obviate back lash.

3. A fishing reel comprising, in combination, a frame; a spool rotatably mounted in the frame; a handle connected to the spool; a cylindrical roller also rotatably mounted in the frame spaced from the spool and having its axis parallel to the spool axis; mechanical connections between the spool and the roller to effect rotation of the roller at a linear speed at least equal to the speed of the spool; said frame having shallow grooves and recesses on the inner walls; an idler roller also rotatably mounted in the frame but movable toward and from the driven roller in said shallow grooves, which serve as guides; and springs to tend to hold the idler roller in peripheral contact with the driven roller; said driven roller also having its ends within shallow recesses in the frame.

4. An anti-back-lash attachment for fishing reels comprising, in combination, a pair of cylindrical rollers having parallel axes, one roller being larger than the other; mechanical connections to drive the larger roller from the spool of the reel but at an increased angular velocity; the smaller roller being movably mounted on the reel; a spring urging the smaller roller into contact with the periphery of the larger roller; said rollers being so positioned that the fishing line may pass between them as it leaves the reel.

RICHARD W. JOHNSON.